June 24, 1930.  J. W. TAYLOR  1,767,021
BALL VALVE
Filed Dec. 1, 1926
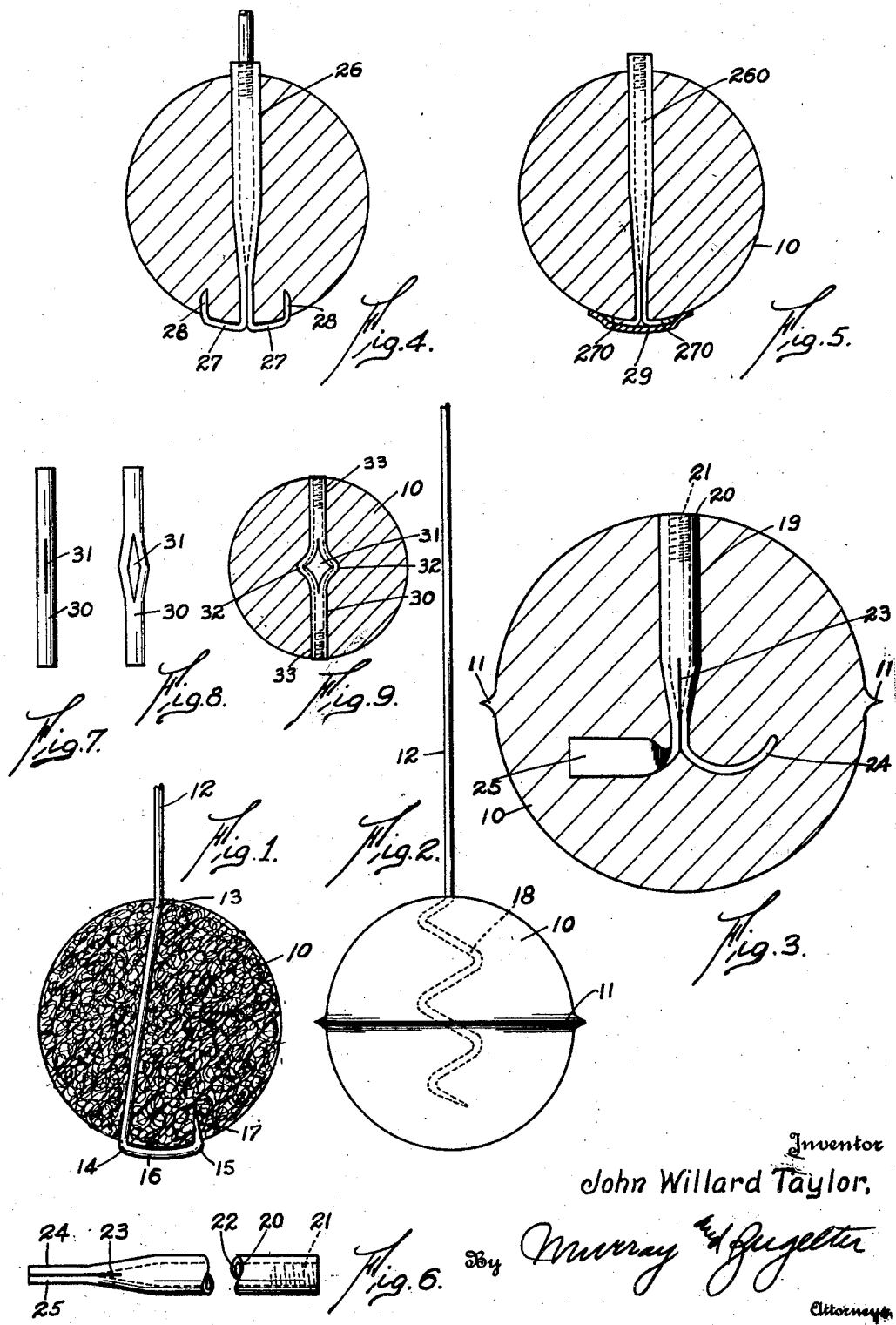
Inventor
John Willard Taylor,
By Murray
Attorneys Patented June 24, 1930

1,767,021

UNITED STATES PATENT OFFICE

JOHN WILLARD TAYLOR, OF CINCINNATI, OHIO

BALL VALVE

Application filed December 1, 1926. Serial No. 152,051.

This invention relates to ball valves, such as may be used for flush tanks, and has for an object, the provision of ball valves which are durable and efficient.

Another object is to provide devices of this kind which may be inexpensively manufactured.

Another object is to provide a valve of the class referred to which is uniform throughout and which, therefore, is not liable to become flabby or limp at its point of seating contact with a valve seat, during use.

These and other objects are attained by the means and the method described herein and disclosed in the accompanying drawing, in which:

Fig. 1 is a cross sectional view of a ball valve of my invention having one simple form of stem.

Fig. 2 is an elevational view of a similar ball valve having a modified form of stem.

Fig. 3 is an elevational view of a ball valve provided with a socket member for receiving a threaded stem.

Figs. 4 and 5 are similar views, on a reduced scale, showing modified forms of stem receiving elements.

Fig. 6 is an elevational view of an uncompleted stem receiving element, such as is shown in Figs. 3, 4 and 5.

Figs. 7 and 8 are elevational views showing a modified form of stem receiving socket prior to insertion in a ball valve.

Fig. 9 is a cross sectional view showing a modified form of valve having embodied therein the double ended socket shown in Figs. 7 and 8.

Heretofore, commonly used ball valves consisted of a hollow rubber ball, adapted to seat upon the valve seat and to be retained thereon initially by its own weight and to be tighly compressed upon such valve seat by the weight of a body of water accumulating within a tank. After a period of use, the wall structure of such hollow rubber valves becomes weakened and flabby, and leakage results, whereupon the valve must be replaced with a new one. The present invention consists primarily in the use of a solid, homogeneous sphere 10, of a material sufficiently light and porous to permit it to function in the same manner as does the ordinary hollow ball valve. In order to attain all of the advantages inherent in the old type of ball valve and at the same time to eliminate the disadvantages thereof, a molded sphere, of sponge rubber, is used for the ball 10. The sphere or ball 10, in the molding operation, has a nonporous surface formed thereon, so that there is no likelihood of a valve becoming water-logged. A circumferential rim or ring 11, resulting from the edge formation of the usual complementary mold portions, is advantageous because it permits of satisfactory use of a ball, which may have been inadvertently chosen in too small a size.

In Figs. 1 and 2, the devices shown are made from solid sponge rubber balls. The stem 12 of the device shown in Fig. 1 is inserted after a bore 13 has been formed in the ball 10 by means of a hot wire. The stem 12 is then inserted into the bore 13 while the sponge rubber surrounding the bore is still in a semi-molten, tacky state. The insertion of the stem 12 at this time permits the molten sponge rubber to adhere to the stem 12 and to seal the pores in the wall of the bore 13 and thereby simply and effectively preclude water-logging of a ball. The stem 12 may then have its protruding end bent as at 14 and 15, to provide a short section 16 which lies against the bottom of the ball and is retained in position by an integral point or spur 17 which extends into the body of the ball.

In Fig. 2, there is shown another stem fastening means, which comprises developing the end of a stem 12 into a spiral 18 after the fashion of a corkscrew. In making this type, a hot instrument of spiral shape is first inserted into the ball for a distance preferably past the center thereof. Upon removal of the heated instrument and while the sponge rubber material of the ball is still in a semi-molten plastic state, the stem 12, having the spiral end 18 as shown, is entered into the bore made by the heated instrument. The purpose and function of the stem fastening means in each of the described forms are substantially the same, viz that the stem is passed into or through the body of the ball, and the bore through which the stem extends has the pores in the walls thereof closed. In each case, there are portions of the stem 12 extending substantially transversely of the length of the stem, so as to preclude separation of the stem and ball when the valve is lifted by the stem.

In Fig. 3 there is disclosed a form of ball valve wherein a stem receiving socket is molded within the ball at the time of making it. The socket indicated generally as 19, is simply and inexpensively prepared by employing a short section of tubing of non-corrosive metal such as brass, and tapping threads 21, for a short distance, into one end of the bore 22 thereof. The opposite end is hammered flat, so as to split the tube for a distance, as at 23, thereby providing a pair of separate, bendable fingers 24 and 25. The finger 24 may be curved outwardly and upwardly, so as to present its flattened face arcuately and transversely of the longitudinal axis of the tube. The other finger 25 may be bent outwardly to extend in the opposite direction from finger 24, but is preferably twisted to an angle of 90 degrees, so as to dispose the opposite flat faces in planes parallel to the longitudinal axis of the tube. The threaded end of the socket 21 is substantially flush with the circumference of the ball and the body of the socket extends radially into said ball.

In Figs. 4 and 5 there are shown socket members, adapted to be inserted into the ball 10 after it is formed. The socket member 26, shown in Fig. 4, is initially prepared substantially in the form shown in Fig. 6 and has fingers 27 having reversed pointed ends 28, which are embedded in the body of the ball, while the intermediate portions of the fingers abut the circumference of said ball.

In Fig. 5 there is shown a somewhat similar socket member 260, which has short fingers 270 disposed entirely outside of the ball and abutting the circumference thereof. In preparing the ball valves as shown in Figs. 4 and 5, a radial bore is formed through the body of the ball with a hot pointed tool and the sockets are inserted in substantially the fashion previously explained in relation to Figs. 1 and 2. A waterproof adhesive patch 29 may be employed to cover either or both protruding ends of either the stem or socket, where such stem or socket extends through the circumference of the ball (for example, see Fig. 5).

In Fig. 9 there is shown a ball valve having a stem receiving socket member 30 extending diametrically therethrough. The socket 30 is simply and inexpensively provided by forming a slit 31 diametrically through a piece of suitable tubing intermediate the ends thereof. The slit 31 is slightly widened by inserting a tool or the like therethrough. Internal threads are then tapped for a distance into each end of the tube. In forming the ball valve as shown in Fig. 9, a bore or perforation is formed diametrically through the ball 10 with a heated implement as previously described. The socket member 30, which is initially of a length somewhat greater than the diameter of the ball 10, is then heated and inserted in the ball. The opposite ends 33 of the socket will then protrude for a distance on each side of the ball. Force is then exerted on opposite ends of the socket until the ends of the socket members lie substantially flush with the circumference of the ball. This results in a widening of the slot 31 and the formation of transverse projections 32 interiorly of the ball.

In preparing the ball for receiving the inserted stem or socket, the hot tool or implement should be smaller in diameter than such stem or socket. The stem or socket is then heated to about 200 degrees F. and forced into the bore or hole in the body of ball. When the inserted stem or socket becomes cool it is adhesively secured in the body of the ball.

The socket shown in the drawings may also be modified by slightly spreading the tubing at the end and wedging a washer on the spread portion. The body of the washer in this form, takes the place of fingers as shown in Fig. 5, or fingers as shown in Fig. 3.

It will be apparent from the disclosures herein that other modified forms of ball valves may be made, all within the spirit of this invention and within the scope of the appended claims.

What is claimed is—

1. In a device of the class described, the combination of a molded sponge rubber body, a tubular socket disposed within said body, an integral finger on said socket having its end embedded in said body and means insertible in the socket for suspending the valve.

2. As a new article of manufacture a valve for flush tanks and the like comprising a multi-cellular body having an integral non-porous surface and an internally threaded tubular member extending through the body and vulcanized therein, said body being attachable to a threaded suspending member at either of its opposite ends.

3. In a float valve for a flush tank, the combination of the multi-cellular soft rubber body having an outer non-pourous pliable surface formed of the substance of the body and a metallic tubulator member extending through the porous mass of said body, the mass of the body contacting said tubular member having the pores thereof sealed and adhesive upon the body of the tubular member.

4. As a new article of manufacture a valve for flush tanks and the like comprising a multi-cellular body having an integral non-pourous surface and an internally threaded tubular member extending through the body said tubular member having projecting means embedded in the body of the rubber, the tubular member being attachable to a threaded suspending means.

In testimony whereof, I, have hereunto subscribed my name this 24th day of November, 1926.

JOHN WILLARD TAYLOR.